(12) United States Patent
Smith et al.

(10) Patent No.: US 6,898,925 B2
(45) Date of Patent: May 31, 2005

(54) WET LEAF GATHERING AND COMPRESSING MACHINE

(75) Inventors: Earl R. Smith, 2409 W. Jordan Rd., Mt. Pleasant, MI (US) 48858; Thomas R. Gross, Mt. Pleasant, MI (US)

(73) Assignee: Earl R. Smith, Wiedman, MI (US)

( * ) Notice: Subject to any disclaimer, the term of this patent is extended or adjusted under 35 U.S.C. 154(b) by 0 days.

(21) Appl. No.: 10/247,597

(22) Filed: Sep. 19, 2002

(65) Prior Publication Data

US 2003/0056483 A1 Mar. 27, 2003

Related U.S. Application Data

(60) Provisional application No. 60/323,813, filed on Sep. 19, 2001.

(51) Int. Cl.⁷ .............................................. A01D 75/00
(52) U.S. Cl. ..................................................... 56/341
(58) Field of Search ........................ 56/344, 12.5, 13.5, 56/14.2–14.5, 16.1, 16.2, 16.7, 400.01, 378–381, 386, 345, 350, 16.6

(56) References Cited

U.S. PATENT DOCUMENTS

| | | | |
|---|---|---|---|
| 2,157,261 A | * | 5/1939 | Innes ........................... 56/182 |
| 2,179,937 A | * | 11/1939 | Lamp ........................... 100/45 |
| 2,536,455 A | | 1/1951 | Miller et al. |
| 2,634,573 A | * | 4/1953 | Carroll ........................ 56/355 |
| 2,656,658 A | | 10/1953 | Grady |
| 2,696,777 A | * | 12/1954 | Sutch .......................... 100/11 |
| 3,222,853 A | | 12/1965 | Michael |
| 3,229,320 A | | 1/1966 | Cymara |
| 3,641,754 A | | 2/1972 | Anstee |
| 3,664,097 A | | 5/1972 | Pedigo |
| 3,736,736 A | | 6/1973 | Myers |
| 3,777,327 A | * | 12/1973 | Ellis ............................ 15/84 |
| 3,791,118 A | | 2/1974 | Behrens |
| 3,922,834 A | | 12/1975 | Clayton |
| 4,044,525 A | | 8/1977 | Forsgren |
| 4,107,903 A | | 8/1978 | Wickersheim |
| 4,223,508 A | | 9/1980 | Wells |
| 4,242,171 A | | 12/1980 | Kauer et al. |
| 4,379,385 A | | 4/1983 | Reinhall |
| 4,412,567 A | * | 11/1983 | Kosters ...................... 141/114 |
| 4,446,677 A | | 5/1984 | Kokido |
| 4,482,019 A | * | 11/1984 | Murphy ....................... 171/63 |
| 4,550,465 A | * | 11/1985 | Chrisley ........................ 15/84 |
| 4,550,553 A | | 11/1985 | Gaither |
| 4,655,128 A | | 4/1987 | St. Clair |
| 4,721,545 A | | 1/1988 | Santorineos |
| 4,771,504 A | * | 9/1988 | VanGinhoven et al. ....... 15/348 |
| 5,087,463 A | | 2/1992 | Raudys et al. |
| 5,155,976 A | | 10/1992 | Okabe et al. |
| 5,197,211 A | * | 3/1993 | Haug .......................... 37/305 |
| 5,295,345 A | | 3/1994 | Ter Haar |
| 5,343,679 A | | 9/1994 | Cymara |
| 5,600,934 A | | 2/1997 | van Rosendal et al. |
| 6,186,060 B1 | * | 2/2001 | Peterson .................... 100/98 R |
| 6,263,649 B1 | * | 7/2001 | Gross et al. ................. 56/16.1 |

\* cited by examiner

*Primary Examiner*—Thomas B. Will
*Assistant Examiner*—Alicia Torres
(74) *Attorney, Agent, or Firm*—Reising, Ethington, Barnes, Kisselle, & Learman, P.C.

(57) ABSTRACT

The wet leaf gathering and compressing machine includes a main frame supported by wheels and adapted to be moved along a path parallel to a leaf windrow. A leaf gathering and compressing frame is pivotally attached to the main frame. A leaf gathering assembly, a leaf elevator and a leaf compressor are attached to the leaf gathering and compressing frame. The leaf compressor includes a pair of cantilevered parallel driven augers. Leaves are deposited on top of a forward portion of the parallel driven augers. the rear portion of the driven augers cooperate with a compression housing to compress leaves and force the compressed leaves into the lower portion of a leaf storage bin.

12 Claims, 15 Drawing Sheets

WET LEAF GATHERING AND COMPRESSING MACHINE

The disclosure incorporates the wet leaf gathering and compressing machine disclosed in provisional patent application No. 60/323,813, filed Sep. 19, 2001, whose priority is claimed for this application.

BACKGROUND OF THE INVENTION

Technical Field

The invention relates to a machine for continuously gathering wet as well as dry tree leaves from a leaf windrow, compressing the leaves and delivering the leaves to a leaf holding container.

Municipal governments collect tree and shrub leaves and other yard debris in the fall of the year. This collection is required because burning of leaves is generally prohibited to improve air quality and to comply with air quality laws. Collection, of leaves and other yard debris, is separated from garbage and other general household trash for composting. Composting is required to reserve landfill space for trash that is not suitable for composting or recycling.

Tree leaves and other yard debris are bagged by homeowners for collection in some communities. Bagging is an impossible task for many homeowners. When the yard materials are bagged, the bags must be handled manually. Manual handling of such bags is labor intensive and therefore expensive. Bags slow the composting process even when biodegradable bags are used. Generally the bags have to be at least partially decomposed before the leaves can start to decompose. Bags which are not readily biodegradable must be separated from leaves and other yard debris before compost made from the leaves and debris is usable. No satisfactory system has been found for removing plastic bags from a compost pile.

The inventors of the wet leaf gathering and compressing machine described herein are also the inventors of U.S. Pat. No. 6,263,649. Their U.S. Pat. No. 6,263,649, the disclosure of which is incorporated herein by reference, discloses a machine for gathering and compressing leaves which works well in most conditions. It has been found however in high moisture conditions their earlier machine has limited capacity.

Wet leaves and yard debris can occur occasionally in all parts of the world. In coastal areas, which have frequent fog and mist, leaves which fall from trees and other plants are often wet. Gathering and conveying such leaves has been found to be relatively difficult and slow. Systems for conveying agricultural crop material, which is generally relatively dry and slides easily on metal plates, may not work well when handling leaves that are wet.

SUMMARY OF THE INVENTION

The leaf and debris pickup, gathering and conveying systems for wet as well as dry leaves and debris includes a transverse auger trough that can float up and down. A roller under the forward portion of the auger trough holds the auger trough a minimum distance above a surface upon which a leaf windrow has been deposited. A feed plate is pivotally attached to the forward portion of the auger trough and extends forwardly and downwardly from the auger trough. The forward edge of the feed plate slides along the surface of a street or other windrow support surface and scrapes leaves and other yard debris up as the machine moves forward. In many situations scraping the leaves up works well. A driven rotatable brush can be mounted adjacent to the leading edge of the feed plate. The brush is driven so that it lifts leaves up and deposits them on top of the feed plate. The quantity of leaves passing on to the feed plate carries leaves and debris into the auger trough.

A gathering auger driven about a transverse horizontal auger axis loads leaves parallel to the auger axis and away from the auger ends and discharges leaves rearwardly and transverse to the auger axis. An overshot elevating conveyor belt receives leaves and debris from the gathering auger and elevates the leaves and debris as they are conveyed rearward.

A pair of parallel cantilevered compression augers mounted side by side in a rectangular tube has its forward ends below a discharge end of the elevating conveyor. The compression augers receive leaves and debris from the elevating conveyor, compress the leaves and convey the leaves rearwardly into a leaf storage bin.

The compressed leaves are forced into the leaf storage bin until the bin is full. After the leaf storage bin is filled, the rectangular tube is disengaged from the bin and the contents of the bin are dumped into a leaf storage or transport container.

BRIEF DESCRIPTION OF THE DRAWINGS

The presently preferred embodiment of the invention is disclosed in the following description and in the accompanying drawings, wherein.

DESCRIPTION OF THE PREFERRED EMBODIMENT

The leaf pickup and leaf compaction machine 10 includes a main frame 12, a leaf pickup and compaction assembly 14 and a leaf storage bin 16. The main frame 12 can have support wheels 18 and a tongue 20 adapted to connect the machine to a tractor. The main frame 12 can also be a portion of a powered vehicle when the leaf pickup and compactor is a self-propelled leaf processor.

The leaf pickup and compaction assemblies 14 include a leaf gathering and compaction subframe 22 with a rear support shaft 24 that is pivotally attached to the main frame 12. A pair of hydraulic cylinders 25 and 26 are pivotally attached to the front portion of the main frame 12 and to a front portion of the leaf pickup and compaction assembly 14 and suspend the pickup and compaction assembly 14 from the main frame 12.

Figure 16:
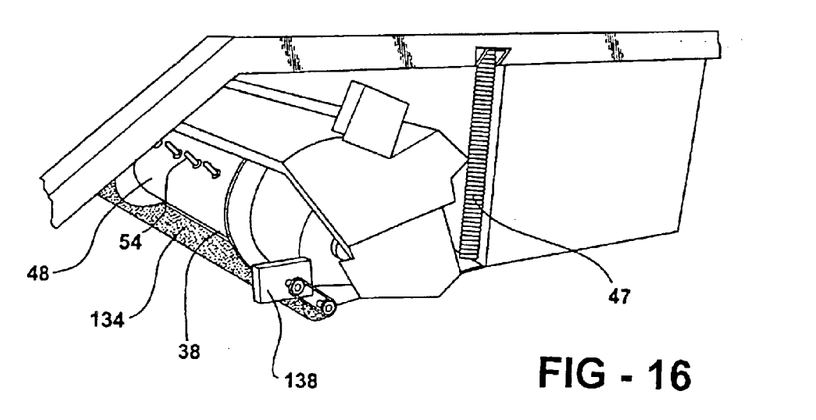
FIG. 16 is a perspective view showing the retractable fingers in the auger and a counter balance spring supporting a portion of the weight of the leaf pickup and compaction assembly with parts broken away.

The leaf gathering and compaction assembly 14 includes a leaf gathering assembly 28, an elevator 30 and a compactor 32. The leaf gathering assembly 28 includes a transverse auger trough 34 with end plates 36. A feed plate 38 is connected to the leading edge 40 of the auger trough 34 by a piano hinge 42. The free forward edge 44 of the feed plate 38 slides along a generally flat surface S to pick up leaves. A chain 43 is attached to each end of the feed plate 38 near the forward edge 44 and to the adjacent end plate 36 to limit downward movement of the forward edge 44 relative to the auger trough 34. A roller 45 is journaled on the auger trough 34 below the auger trough leading edge 40 to support the auger trough 34 and control the vertical distance between the auger trough and a leaf support surface S. Springs 47 can be provided to reduce the load on the roller 45 as shown in FIG. 16. A gas filled accumulator in the hydraulic system with the hydraulic cylinders 25 and 26 can be used in place of the springs 47 to reduce the load on the roller 45 and facilitate vertical movement of the auger trough 34.

The transverse auger 46 includes an auger tube 48 with its ends journaled on the end plates 36. Flighting 50 on each end of the tube 48 conveys leaves away from the end plate 36, along the floor 52 of the auger trough toward the center of the auger. A plurality of retractable fingers 54 projects through bearings 56 in the auger tube 50 in the center section of the tube 48. These retractable fingers 54 rotate about a finger axis that is spaced from the auger axis and the tips follow a path represented by the envelope 58. These retractable fingers 54 move leaves in the auger trough 34 to the rear and through an elevator housing inlet 60 in the elevator housing section 62 and into the elevator 30.

The elevator 30 includes a belt conveyor assembly 64 that receives the leaves forced through the elevator housing inlet 60. The belt conveyor assembly 64 includes a lower transverse idler roller 66 journaled under the auger trough 34 in the elevator housing 62. A driven upper transverse roller 68 is journaled on the side walls 70 and 72 of the elevator housing 62. An endless conveyor belt 74 is trained around the lower transverse idler roller 66 and the upper transverse roller 68. The upper transverse roller 68 is driven by a hydraulic motor 76 so that the upper run of the elevator conveyor belt 74 elevates leaves, carries leaves to the rear and discharges elevated leaves into a leaf compaction chamber 78. The driven upper transverse roller 68 is movable toward and away from the idler roller 66 to adjust the tension on the endless conveyor belt 74.

Two parallel spaced apart compaction augers 80 and 82 are mounted in the compaction chamber 78. The forward ends of the compaction augers 80 and 82 includes auger shafts 84 and 86 that are journaled in forward bearings 88 and 90 mounted on a transverse bar 92, and rear bearings 94 and 96 mounted on a traverse bar 98 under the elevator conveyor belt 74. The forward bearings 88 and 90 are spaced a substantial distance forward of the rear bearings 94 and 96. Auger flighting 99 and 100 is welded to the cantilevered portions of the auger shafts 84 and 86 to the rear of the rear bearings 94 and 96.

The compaction augers 80 and 82 are parallel to each other and spaced horizontally from each other. The elevator assembly 30 discharges leaves on top of the forward portions of the auger flighting 99 and 100. The augers 80 and 82 move the leaves rearward and into a rectangular leaf compaction chamber 102 with a floor 104, side walls 106 and 108 and a top wall 110. The discharge end of the compaction chamber 102 extends through an opening 112 in the front wall 114 of the leaf storage bin 16.

A sprocket 116 is mounted on the auger shaft 84 between the forward bearing 88 and the rear bearing 94. A hydraulic motor 118 with a drive sprocket 120 and an endless drive chain 121, trained around the drive sprocket 120 and the driven sprocket 116, drive the auger 80. A sprocket 122 is mounted on the auger shaft 86 between the forward bearing 90 and the rear bearing 96. A hydraulic motor 124 with a drive sprocket 126 and an endless drive chain 127 trained around the drive sprocket 126 and the driven sprocket 122 drive the auger 82.

Figure 1:
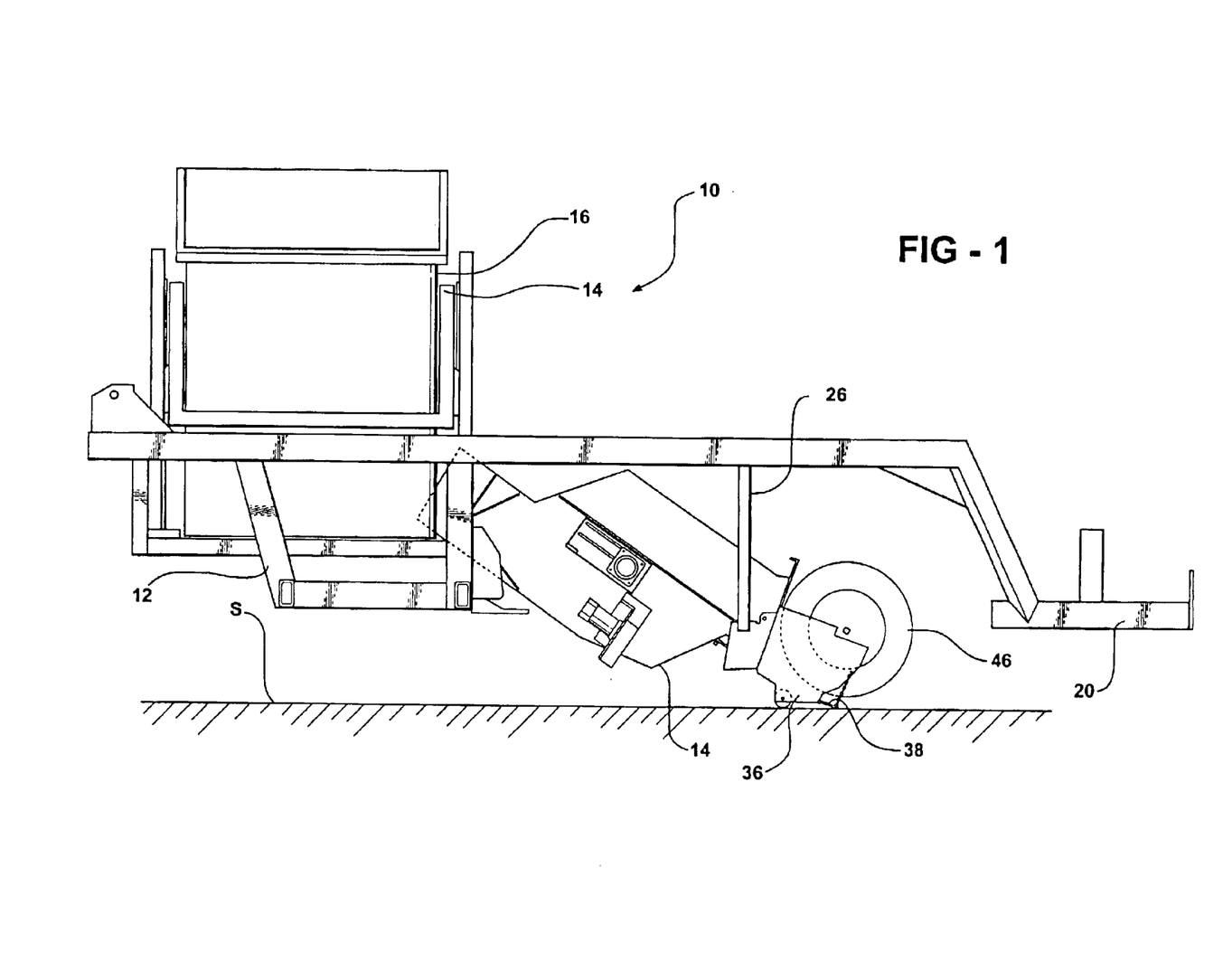
FIG. 1 is a right side elevational view of the wet leaf gathering and compressing machine with a side dump bin in position to receive compacted leaves and the rear axle removed.
Figure 2:
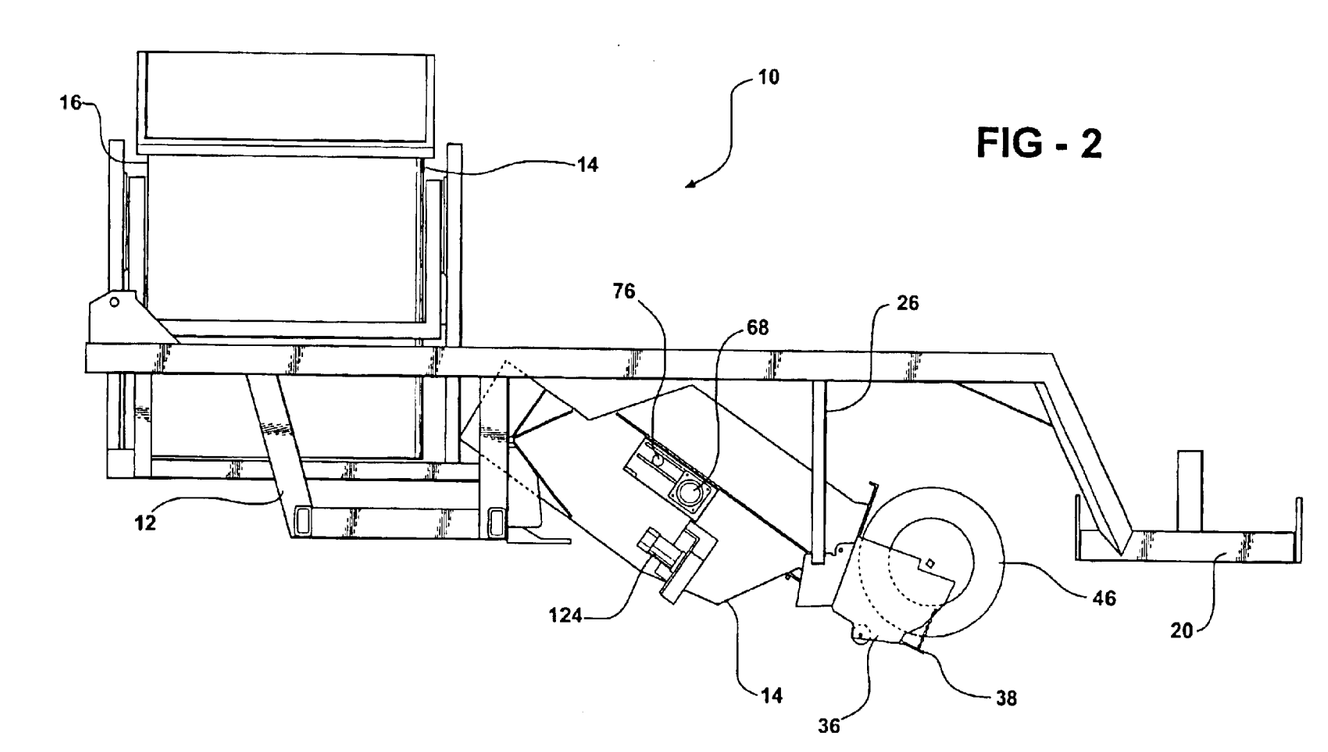
FIG. 2 is a view similar to FIG. 1 with the bin moved to the rear.
Figure 3:
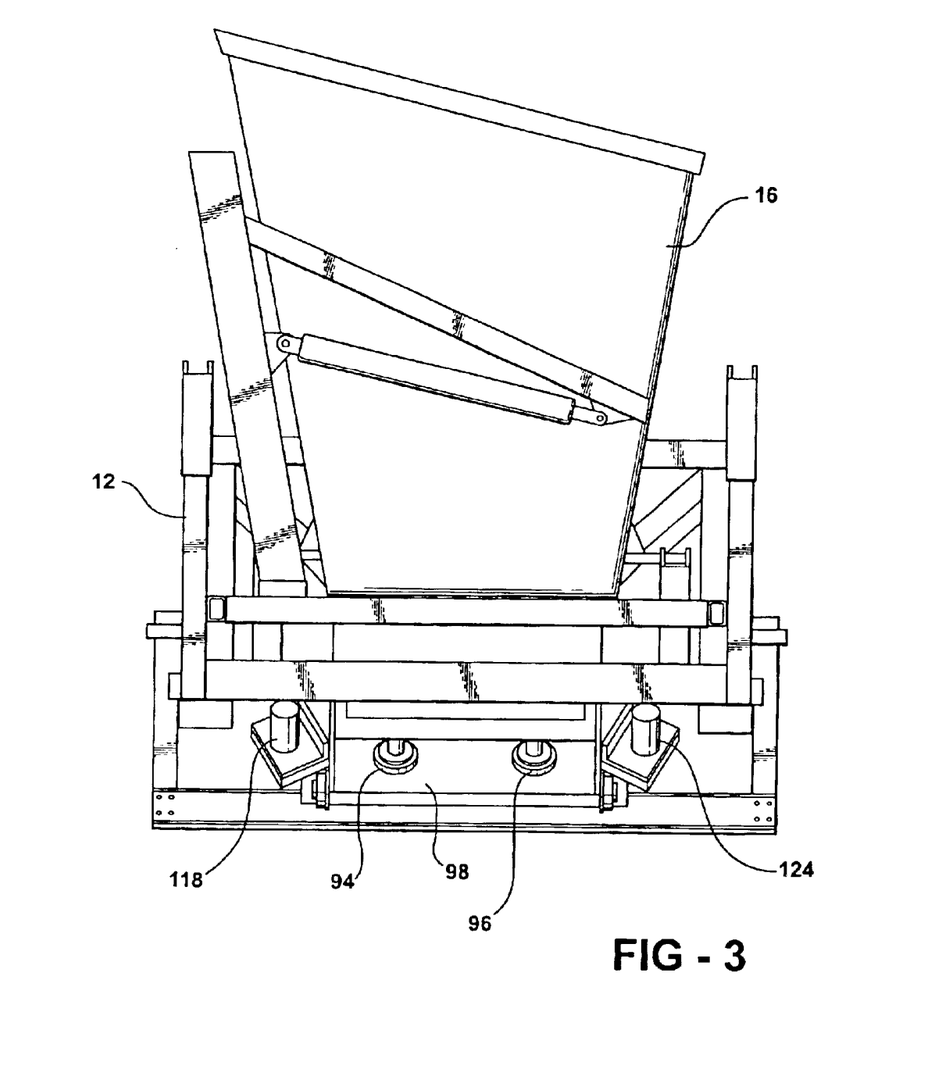
FIG. 3 is a rear elevational view of a compactor with a side dump bin in a lowered position and the rear axle removed.
Figure 4:
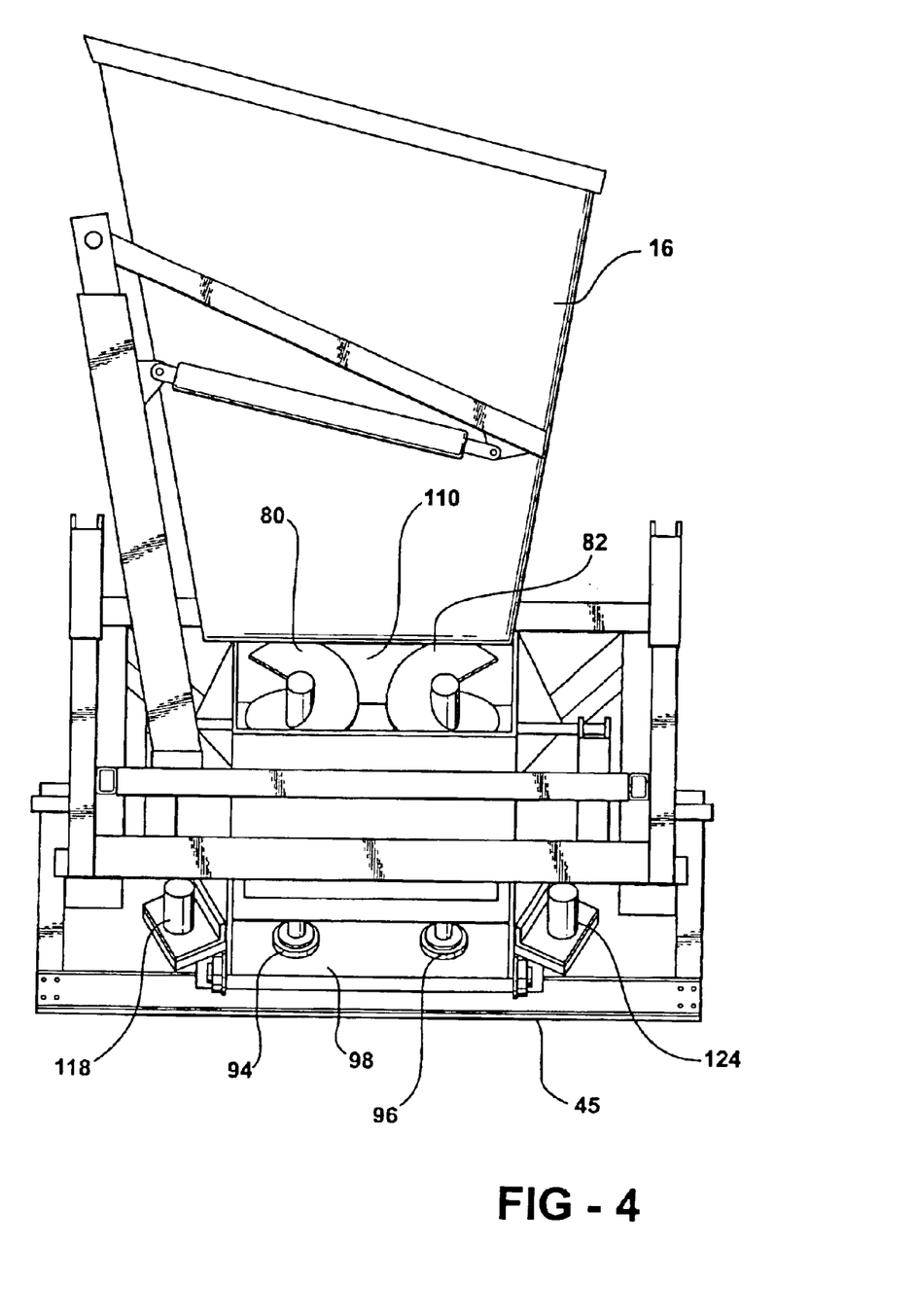
FIG. 4 is a view similar to FIG. 3 with the bin partially raised.
Figure 5:
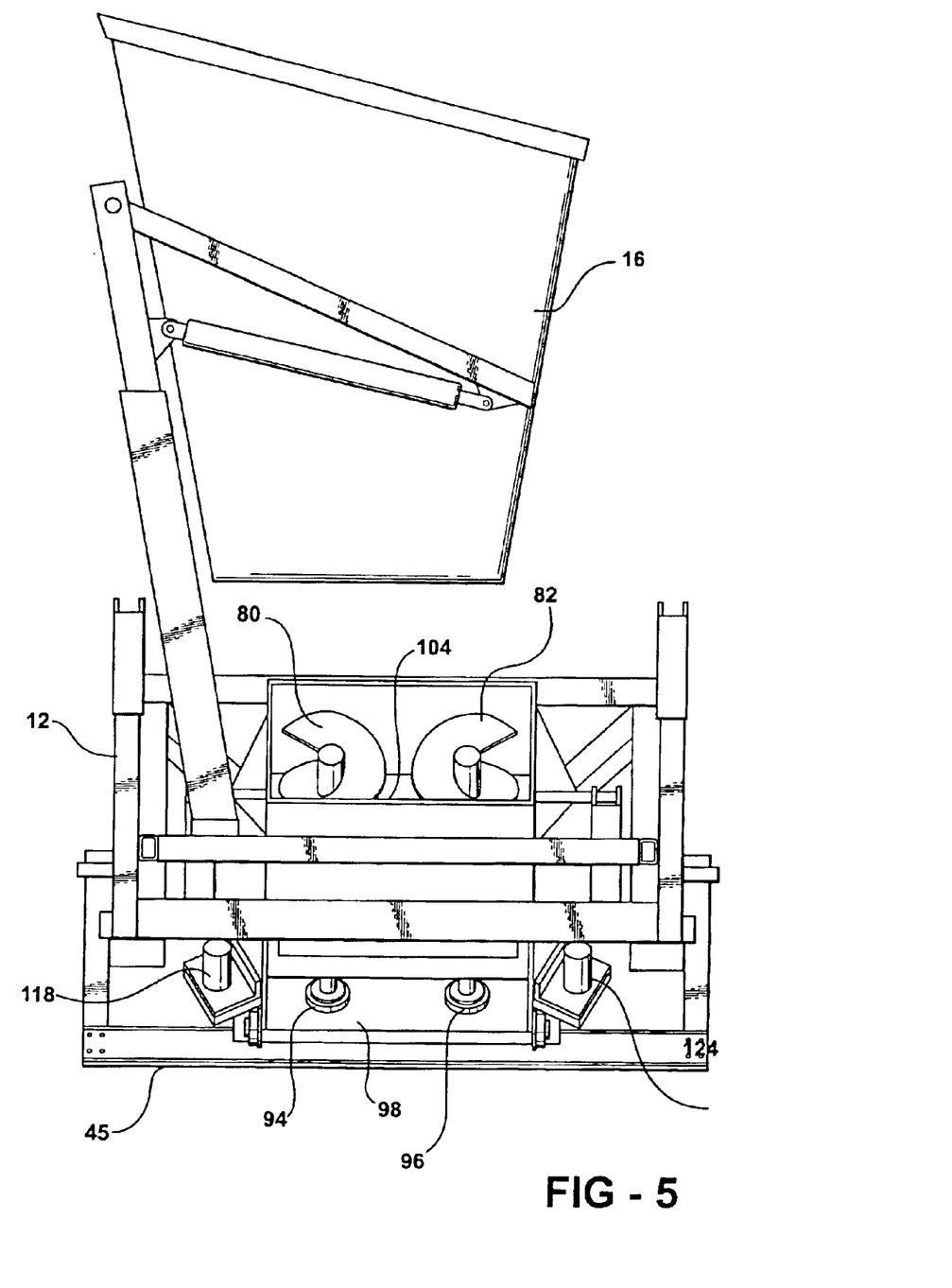
FIG. 5 is a view similar to FIG. 3 with the bin fully raised.
Figure 6:
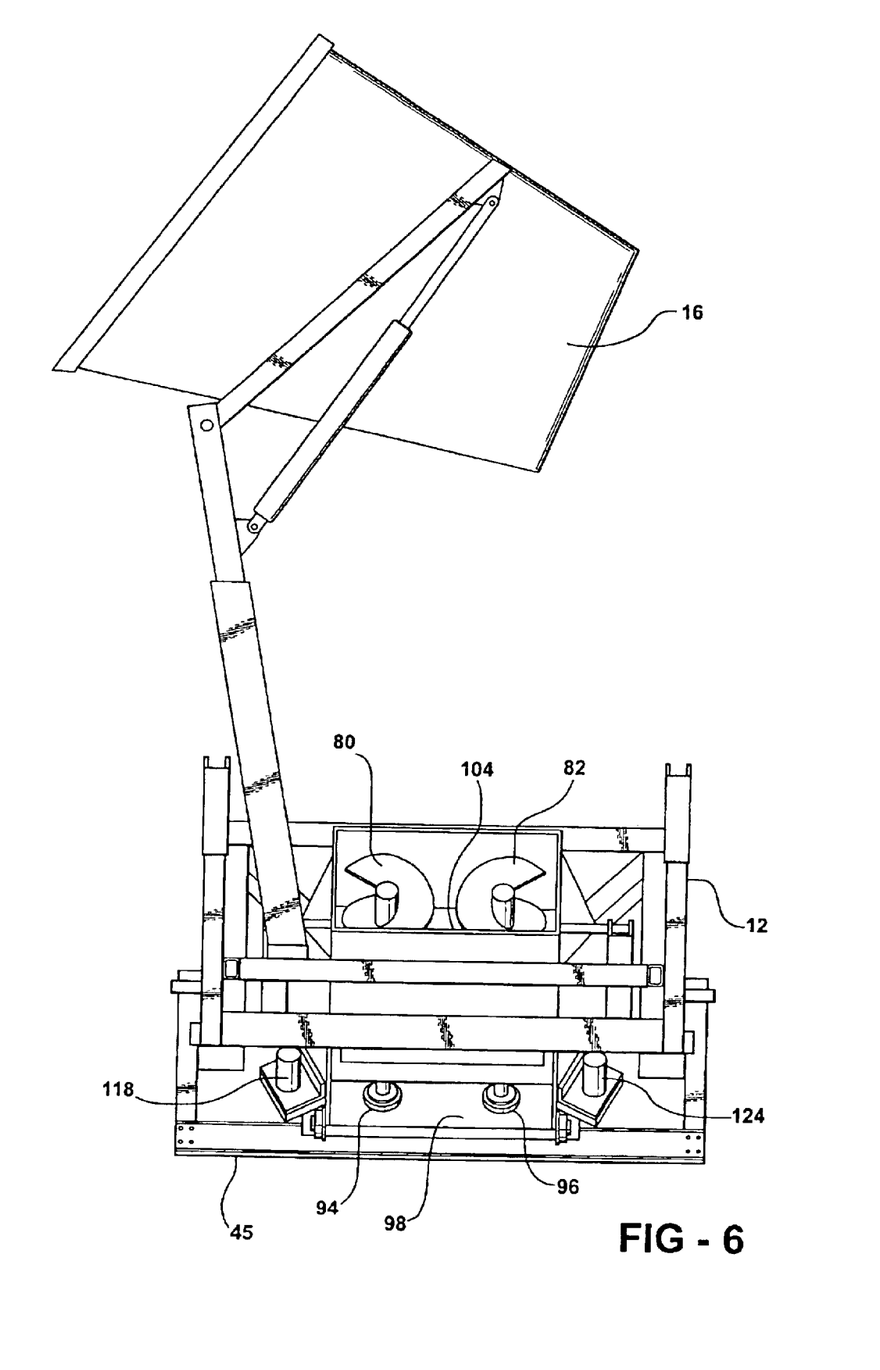
FIG. 6 is a view similar to FIG. 5 with the bin partially tilted for dumping compacted leaves.
Figure 7:
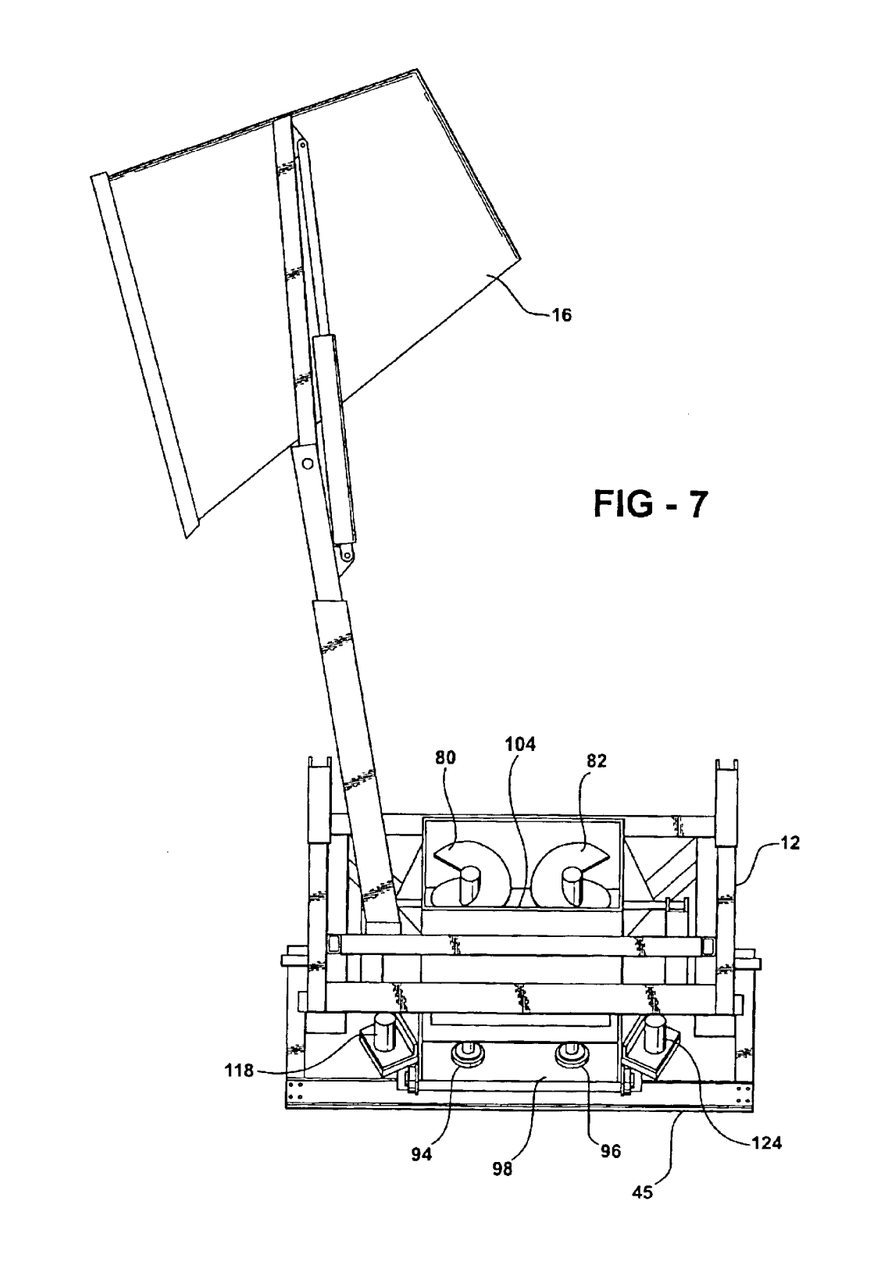
FIG. 7 is a view similar to FIG. 5 with the bin fully tilted for dumping.
Figure 8:
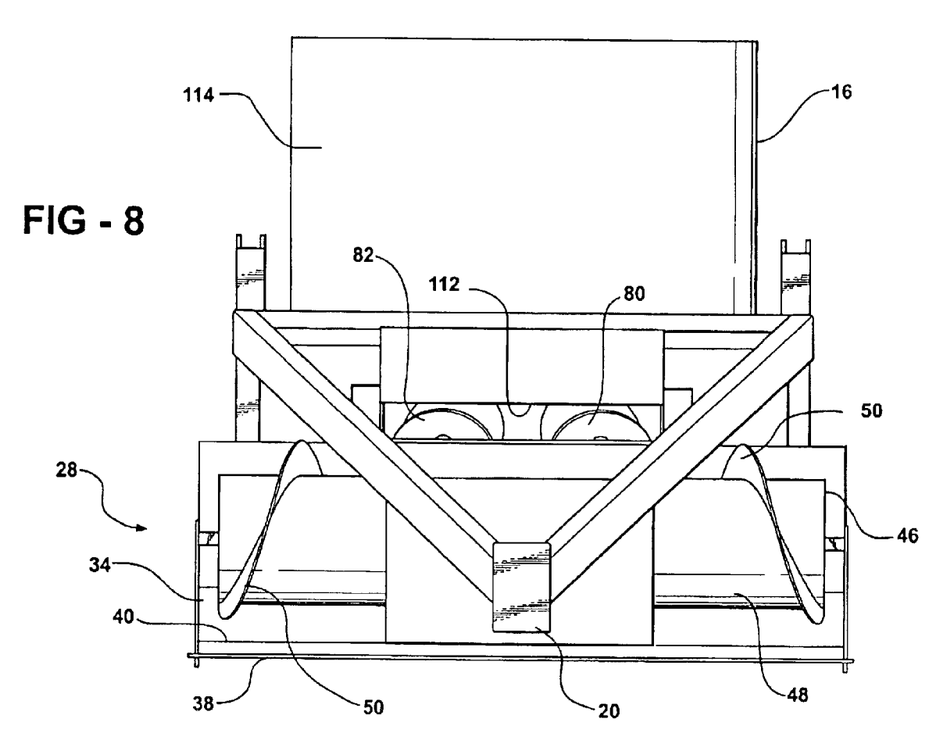
FIG. 8 is a front elevational view of the leaf compactor with a rear dump bin.
Figure 9:
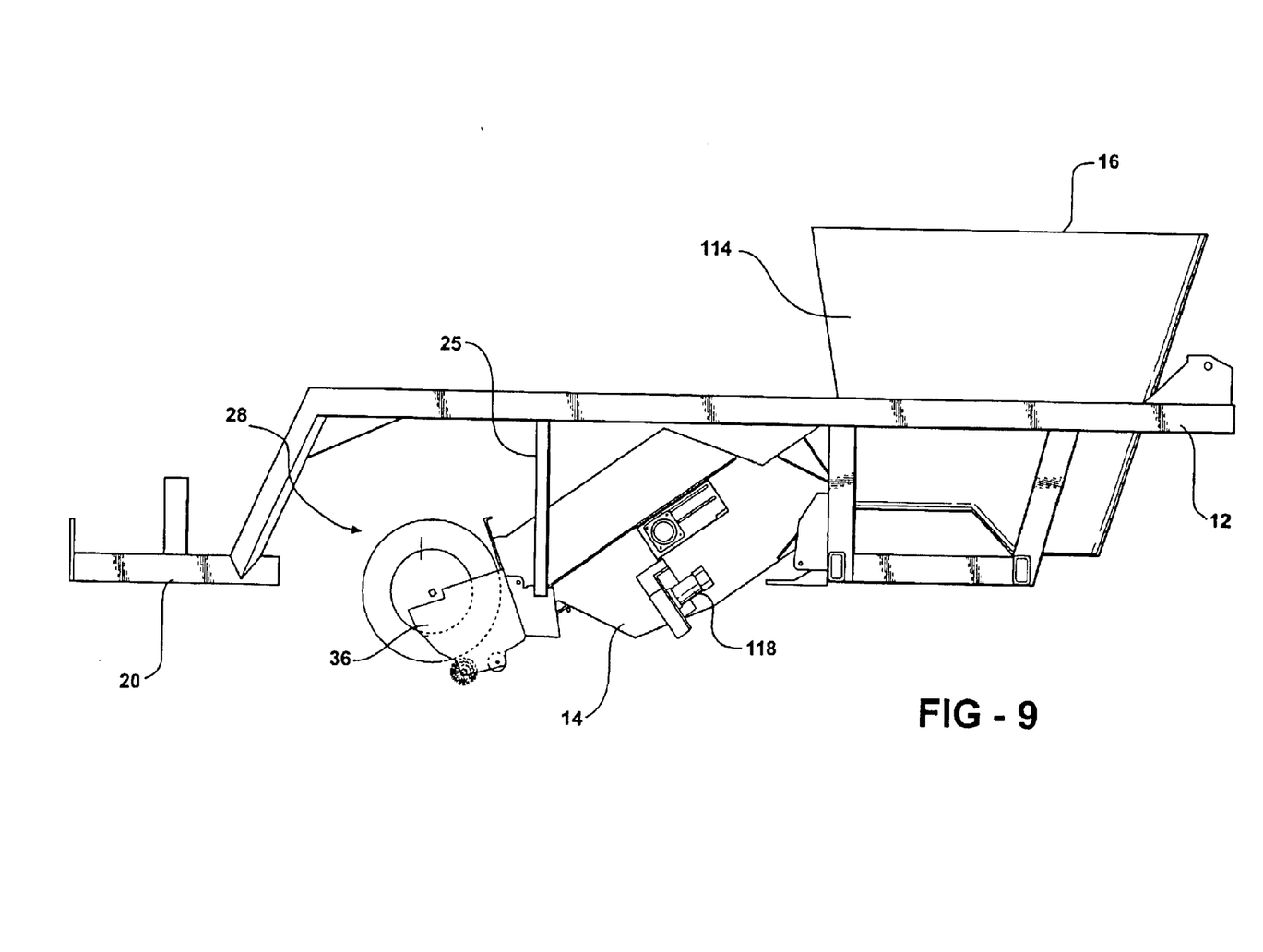
FIG. 9 is a left side elevation view of the leaf pickup and compactor with a rear dump bin and parts removed.
Figure 10:
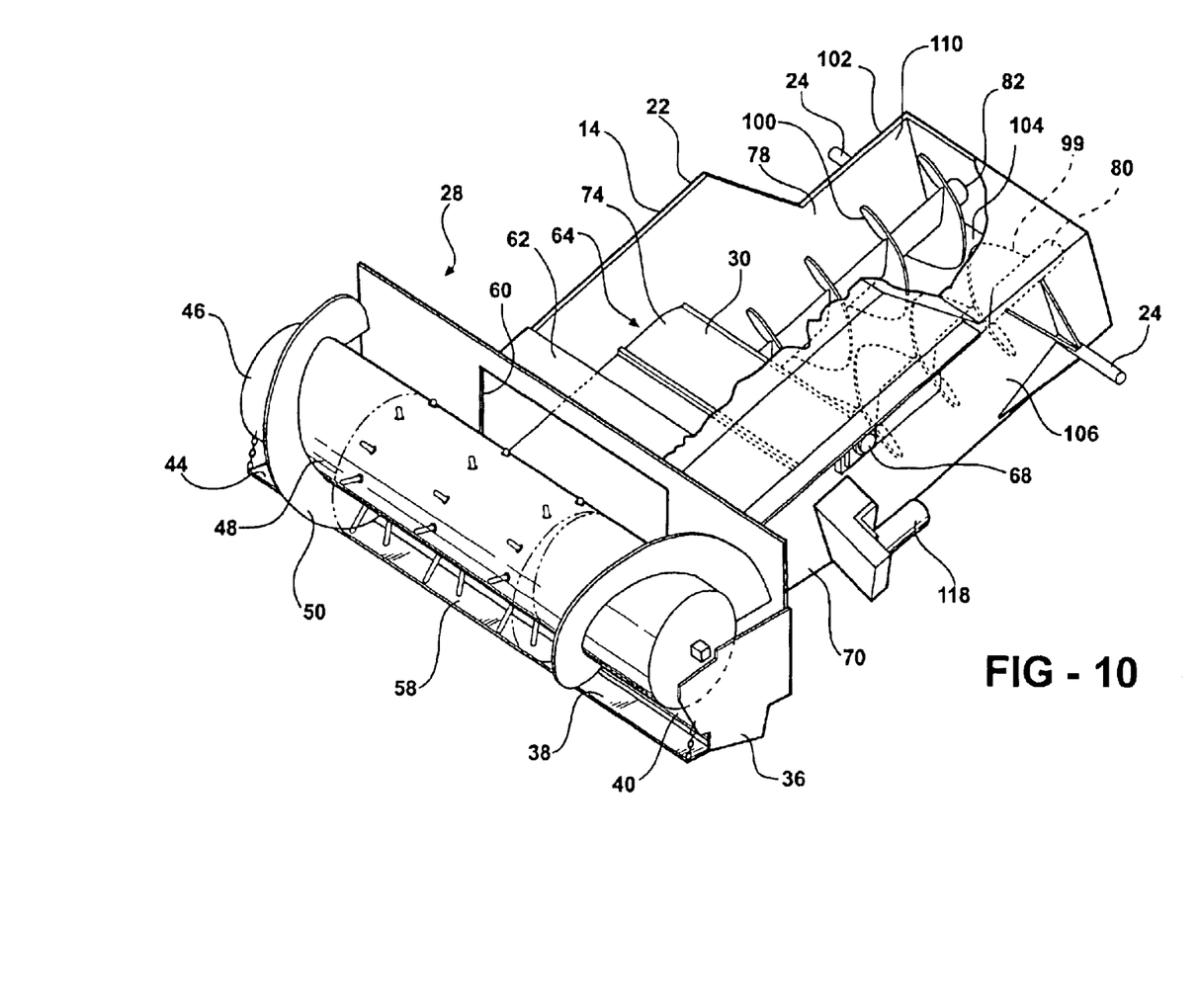
FIG. 10 is a perspective view of the leaf pickup and compactor assembly with parts broken away.
Figure 11:
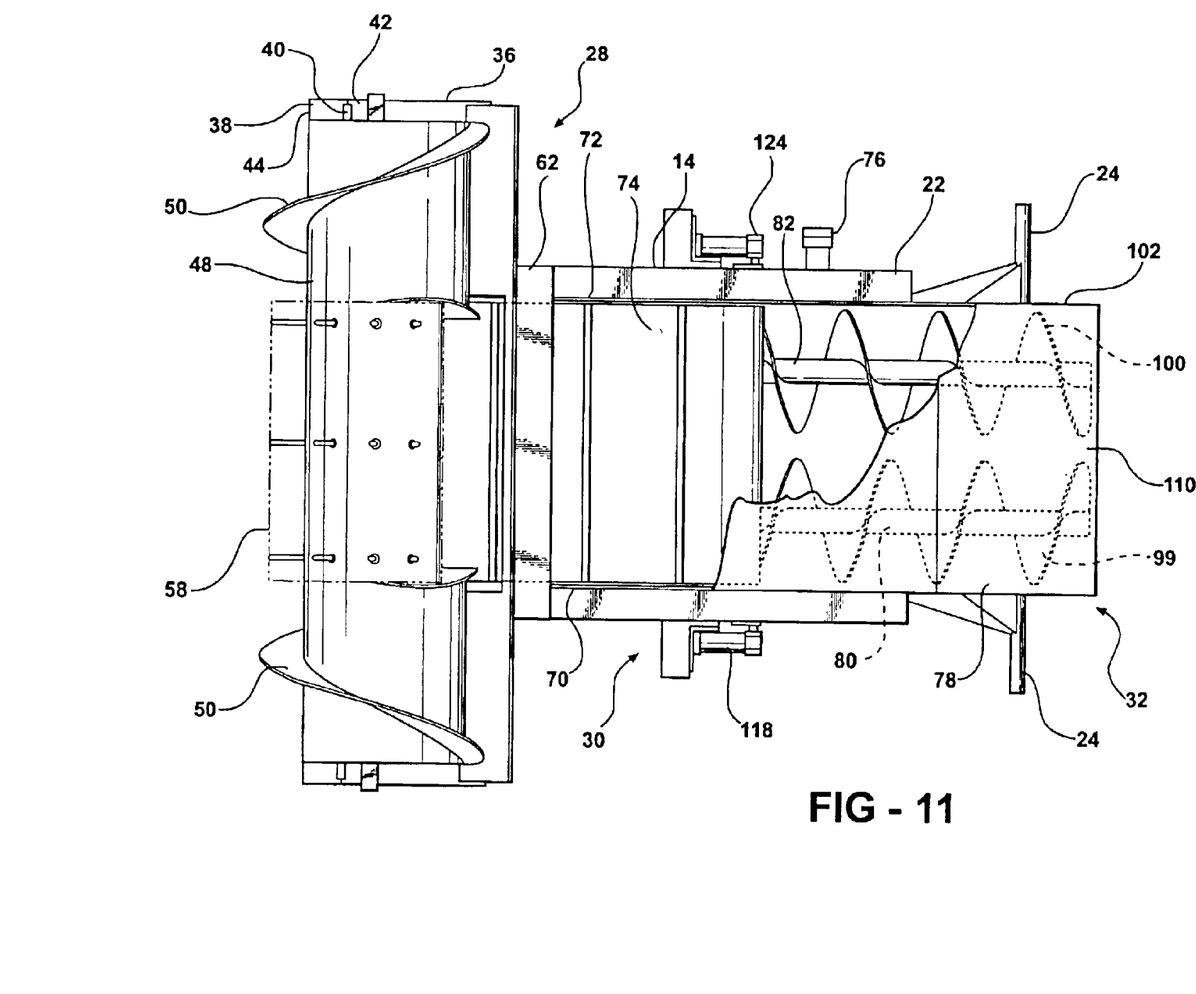
FIG. 11 is a top plan view of the leaf pickup and compactor assembly with parts broken away.
Figure 12:
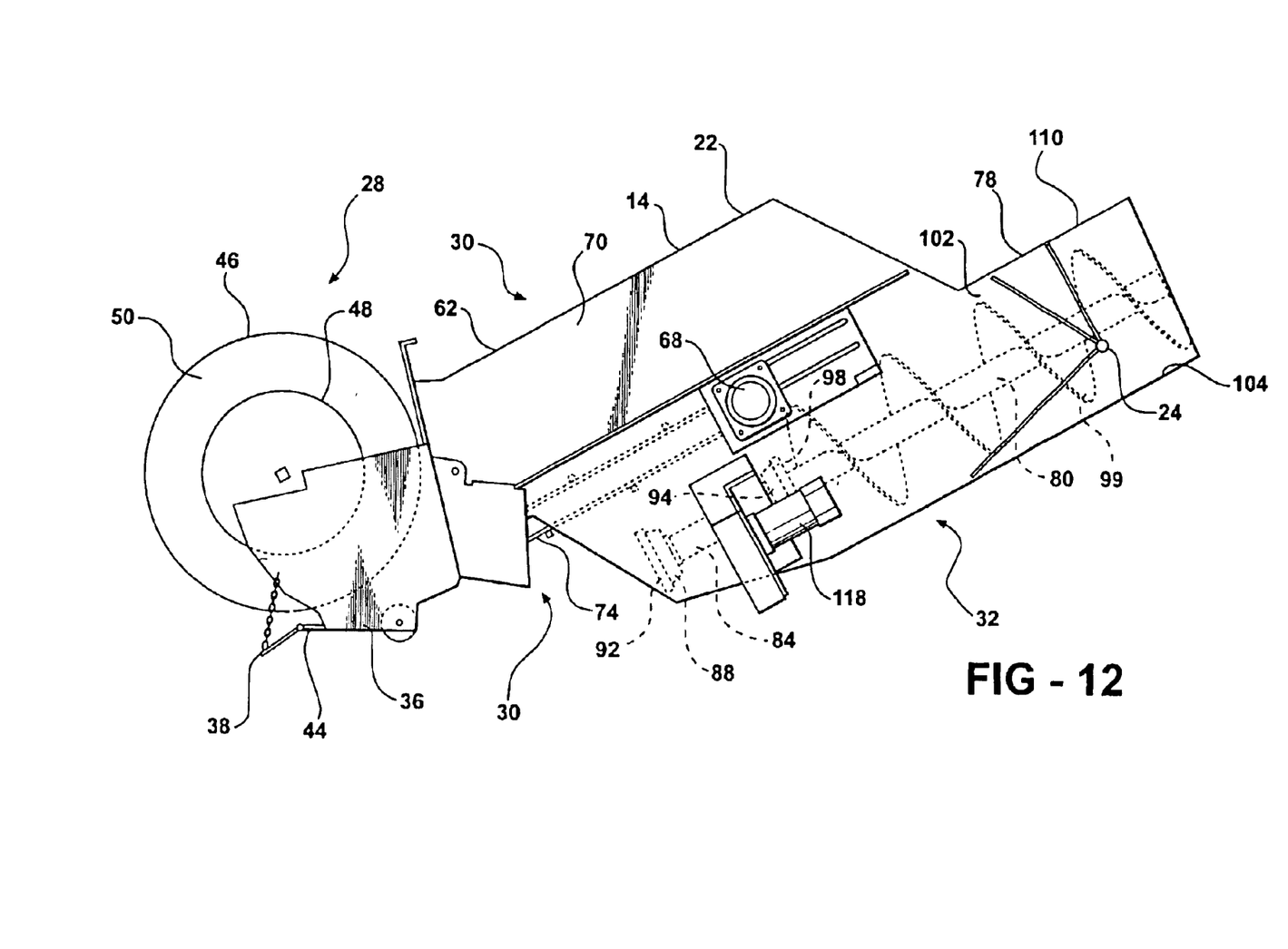
FIG. 12 is a side elevational view of the leaf pickup and compactor with parts broken away.
Figure 13:
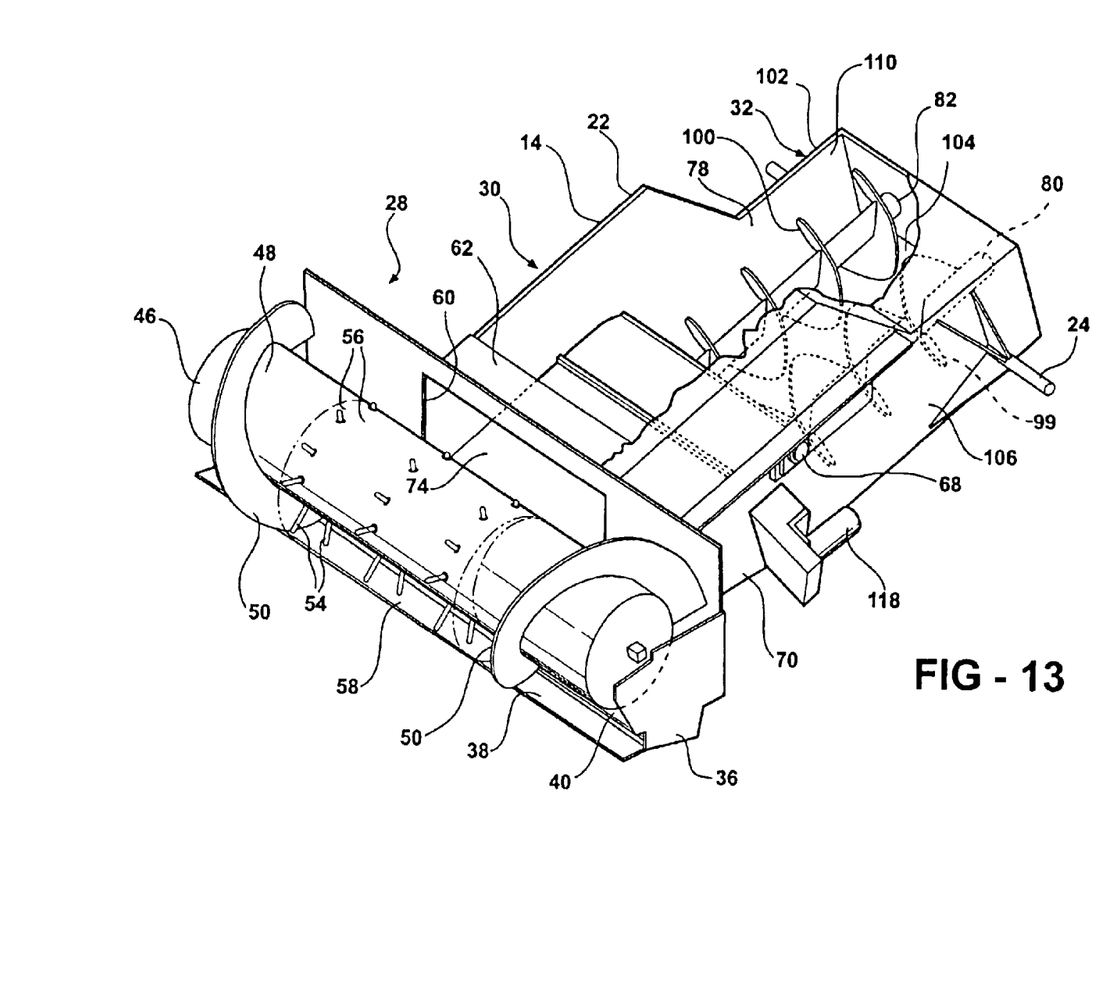
FIG. 13 is a perspective view of the leaf pickup and compactor assembly with parts broken away.
Figure 14:
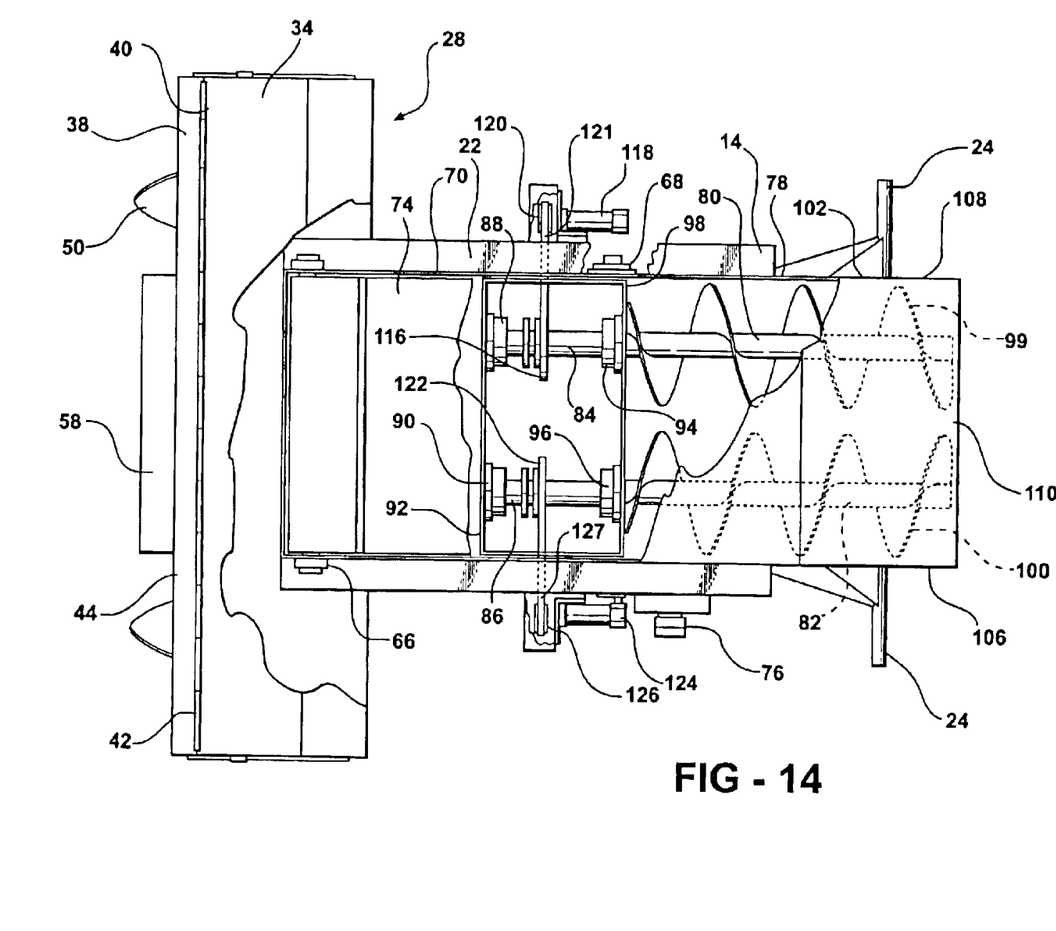
FIG. 14 is a bottom view of the leaf pickup and compactor assemblies.
Figure 15:
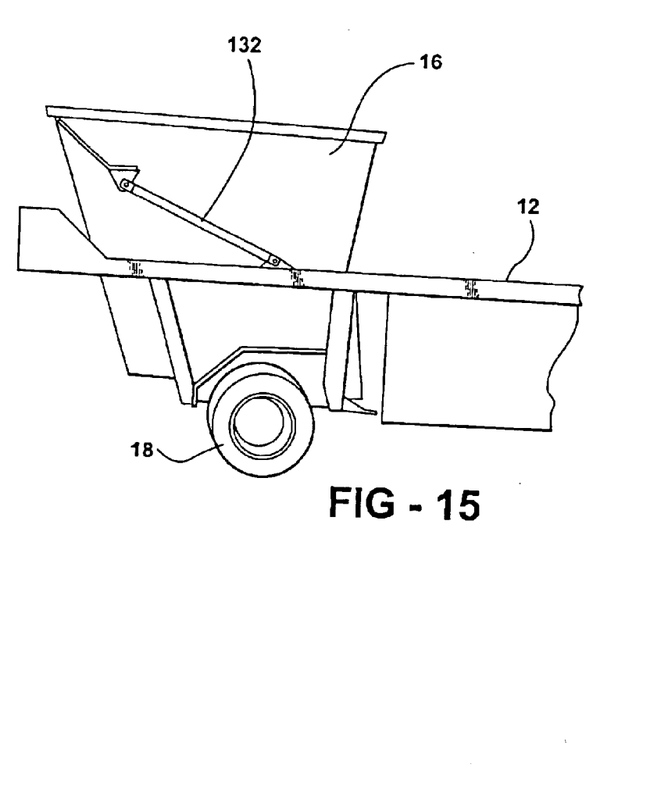
FIG. 15 is a side elevational view showing the axle and support wheels and a rear dump bin with parts broken away.

The bin 16 is moved horizontally to the rear to clear the discharge end of the leaf compaction chamber 102 and then raised and tilted by hydraulic cylinders 128 and 132 to discharge compacted leaves. The bin 16 as shown in the drawings dumps compacted leaves to one side of the main frame 12. The bin 16 could also be arranged to dump compacted leaves to the rear of the main frame 12 as shown in FIGS. 8, 9 and 15. A rear discharge bin is also shown in U.S. Pat. No. 6,263,649.

A cylindrical brush 134 can be journaled on floating end plates 136 mounted on the ends of the feed plate 38 if desired. The brush 134 is forward of the free forward edge 44 of the feed plate 38. A hydraulic motor 138 drives the brush 134 in a clockwise direction as shown in FIGS. 9 and 16 to lift leaves up onto the feed plate 38. By using the driven brush 134 the surface S is cleaned as a windrow of leaves is picked up and compressed.

It is understood that the disclosed embodiment is representative of a presently preferred form of the invention and that others that accomplish the same function are incorporated herein within the scope of any ultimately allowed patent claims.

What is claimed is:

1. A leaf gathering and compressing machine comprising:
   a main frame supported by wheels and adapted to be moved along a path parallel to a leaf windrow;
   a leaf gathering and compression frame pivotally attached to the main frame;
   a leaf gathering assembly including a transverse auger trough mounted on a forward portion of the leaf gathering and compression frame and including a trough feed plate, a left side end plate attached to a left end of the transverse auger trough, a right side end plate attached to a right end of the transverse auger trough, a transverse auger journaled on the left side end plate and the right side end plate that conveys leaves in the auger trough to an elevator housing inlet;

an elevator housing mounted on the leaf gathering and compression frame, an elevator belt conveyor with a lower elevator roller journaled on the leaf gathering and compression frame and positioned inside the elevator housing and below the elevator housing inlet, an upper elevator roller journaled on the leaf gathering and compression frame and positioned inside the elevator housing and to the rear of the lower roller, a continuous elevator belt trained around the lower elevator roller and the upper elevator roller, and an elevator drive that drives the continuous elevator belt with an upper belt run that receives leaves passing through the elevator housing inlet and conveys leaves upwardly and rearwardly; and a pair of spaced apart parallel cantilevered compression augers each having a forward end journaled on the leaf gathering and compression frame below the upper elevator roller, a compression auger drive connected to the forward end of each compression auger, and auger flighting of each compression auger having a front flighting portion that receives leaves discharged from the elevator belt conveyor and a rear flighting portion that extends into a leaf compression chamber, compresses leaves received from the front flighting portion and forces compressed leaves from the leaf compression chamber.

2. A leaf gathering and compressing machine, as set forth in claim 1, wherein the trough feed plate is pivotally attached to the auger trough for pivotal movement about a feed plate axis.

3. A leaf gathering and compressing machine, as set forth in claim 2 wherein the feed plate has a leading edge that slides along surfaces supporting leaves that are to be gathered.

4. A leaf gathering and compressing machine, as set forth in claim 1 wherein the transverse auger trough is rigidly connected to the leaf gathering and compression frame.

5. A leaf gathering and compressing machine, as set forth in claim 1, wherein the compression auger drive includes at least one hydraulic motor.

6. A leaf gathering and compressing machine, as set forth in claim 1, wherein the compression auger drive includes a pair of hydraulic motors.

7. A leaf gathering and compressing machine, as set forth in claim 1, wherein the leaf compression chamber has a generally rectangular cross section.

8. A leaf gathering and compressing machine, as set forth in claim 1, wherein at least one hydraulic cylinder is connected to the main frame and to the leaf gathering and compression frame and operable to pivot the leaf gathering and compression frame relative to the main frame and move the transverse auger trough vertically.

9. A leaf gathering and compressing machine, as set forth in claim 1, including a transverse roller mounted below the transverse auger trough and controlling the minimum height of the transverse auger trough.

10. A leaf gathering and compressing machine, as set forth in claim 1, including a driven brush journaled on the leaf gathering and compression frame for rotation about a transverse horizontal axis and operable to lift leaves from a leaf support surface.

11. A leaf gathering and compressing machine, as set forth in claim 10, wherein the driven brush is adjacent to a leading edge of the feed plate.

12. A leaf gathering and compressing machine, as set forth in claim 11, wherein the feed plate is pivotally attached to the auger trough and the driven brush is mounted directly on the feed plate.

\* \* \* \* \*